(12) United States Patent
Bok

(10) Patent No.: US 12,718,228 B2
(45) Date of Patent: Aug. 25, 2026

(54) NFT OBJECT MANAGEMENT SYSTEM AND NFT OBJECT MANAGEMENT METHOD

(71) Applicant: Samsung Display Co., Ltd., Yongin-Si (KR)

(72) Inventor: Seung-Lyong Bok, Yongin-si (KR)

(73) Assignee: Samsung Display Co., Ltd., Yongin-Si (KR)

( * ) Notice: Subject to any disclaimer, the term of this patent is extended or adjusted under 35 U.S.C. 154(b) by 189 days.

(21) Appl. No.: 18/240,356

(22) Filed: Aug. 31, 2023

(65) Prior Publication Data

US 2024/0185224 A1 Jun. 6, 2024

(30) Foreign Application Priority Data

Dec. 5, 2022 (KR) ........................ 10-2022-0168055

(51) Int. Cl.
*G06Q 20/36* (2012.01)

(52) U.S. Cl.
CPC ..... *G06Q 20/3672* (2013.01); *G06Q 2220/00* (2013.01)

(58) Field of Classification Search
None
See application file for complete search history.

(56) References Cited

U.S. PATENT DOCUMENTS 9,793,444 B2 10/2017 Yamazaki et al.
11,182,467 B1 * 11/2021 Medina .................. G06F 3/147
11,308,487 B1 * 4/2022 Foster ................. G06Q 20/065
12,141,871 B1 * 11/2024 James ................. G06Q 20/065
2020/0219093 A1 * 7/2020 Malhotra ............ G06Q 20/389
2023/0188350 A1 6/2023 Arora
2025/0104051 A1 * 3/2025 English ............. G06Q 20/3678
2025/0111017 A1 * 4/2025 Koie ...................... G06F 21/10

FOREIGN PATENT DOCUMENTS

KR 10-2322511 B1 11/2021
KR 10-2340588 B1 12/2021

* cited by examiner

*Primary Examiner* — Jamie R Kucab
(74) *Attorney, Agent, or Firm* — Innovation Counsel LLP

(57) ABSTRACT

Disclosed is an NFT object management system including an NFT object management server that issues an NFT for an NFT object and assigns a code to the NFT, and a first user terminal that generates the NFT object and transmits the NFT object to the NFT object management server. The NFT object management server includes an NFT issuance module and a code management module. The NFT issuance module receives basic information about the NFT object from the first user terminal and issues the NFT for the NFT object. The code management module receives the basic information about the NFT object and device information of the first user terminal and generates the code for the NFT object based on the basic information and the device information.

8 Claims, 8 Drawing Sheets

| 1. Company A<br>2. Company B<br>3. Company C<br>4. Company D | 1. OLED<br>2. LCD<br>3. Others | 1. 4k<br>2. 8k | 1. NTSC 90%<br>2. NTSC 96%<br>3. NTSC 100%<br>4. NTSC 106% |
|---|---|---|---|

NFT_C
1 5 a 3 2 0 1 4 b
Dis_C
1 2 2 1
1. Company A
2. Company B
3. Company C
4. Company D
1. OLED
2. LCD
3. Others
1. 4k
2. 8k
1. NTSC 90%
2. NTSC 96%
3. NTSC 100%
4. NTSC 106%

Dis_Ca
0 X 7 4
NFT_C
1 5 a 3 2 0 1 4 b

NFT OBJECT MANAGEMENT SYSTEM AND NFT OBJECT MANAGEMENT METHOD

CROSS-REFERENCE TO RELATED APPLICATIONS

This application claims priority under 35 U.S.C. § 119 to Korean Patent Application No. 10-2022-0168055 filed on Dec. 5, 2022, in the Korean Intellectual Property Office, the disclosures of which are incorporated by reference herein in their entireties.

BACKGROUND

The present disclosure relates to a non-fungible token (NFT) object management system and an NFT object management method.

Nowadays, asset values for various objects such as various pieces of content or products have been created, and thus a case of managing or investing in assets is increasing. Accordingly, because each of the objects has an asset value, the objects may be a transaction target with others. As such, in a process of transacting the corresponding object, there is a need for a method of delivering the object after an ownership is clearly identified. To this end, a technology or method for verifying ownership information about the corresponding object by using a blockchain-based NFT or for transacting the corresponding object is being developed.

SUMMARY

Embodiments of the present disclosure may provide an NFT object management system and an NFT object management method that are capable of preventing an original image of an NFT object from being distorted.

According to an embodiment, an NFT object management system includes an NFT object management server that issues an NFT for an image of an NFT object and assigns a code to the NFT and a first user terminal that communicates with the NFT object management server, generates the image of the NFT object, and transmits the image of the NFT object to the NFT object management server.

The NFT object management server includes an NFT issuance module and a code management module. The NFT issuance module receives basic information about the NFT object from the first user terminal and issues the NFT for the NFT object. The code management module receives the basic information about the NFT object and device information of the first user terminal from the first user terminal, generates the code for the NFT object based on the basic information and the device information, and verifies the NFT object based on the code.

According to an embodiment, an NFT object managing method includes generating an NFT object and transmitting the NFT object to an NFT object management server, issuing an NFT for the NFT object, and assigning a code to the NFT and managing the assigned code.

The issuing of the NFT includes receiving basic information about the NFT object from the first user terminal and issuing the NFT for the NFT object based on the basic information.

The assigning the code includes receiving the basic information about the NFT object and device information of the first user terminal from the first user terminal and generating the code for the image of the NFT object based on the basic information and the device information.

BRIEF DESCRIPTION OF THE FIGURES

The above and other objects and features of the present disclosure will become apparent by describing in detail embodiments thereof with reference to the accompanying drawings.

DETAILED DESCRIPTION

Figure 1:
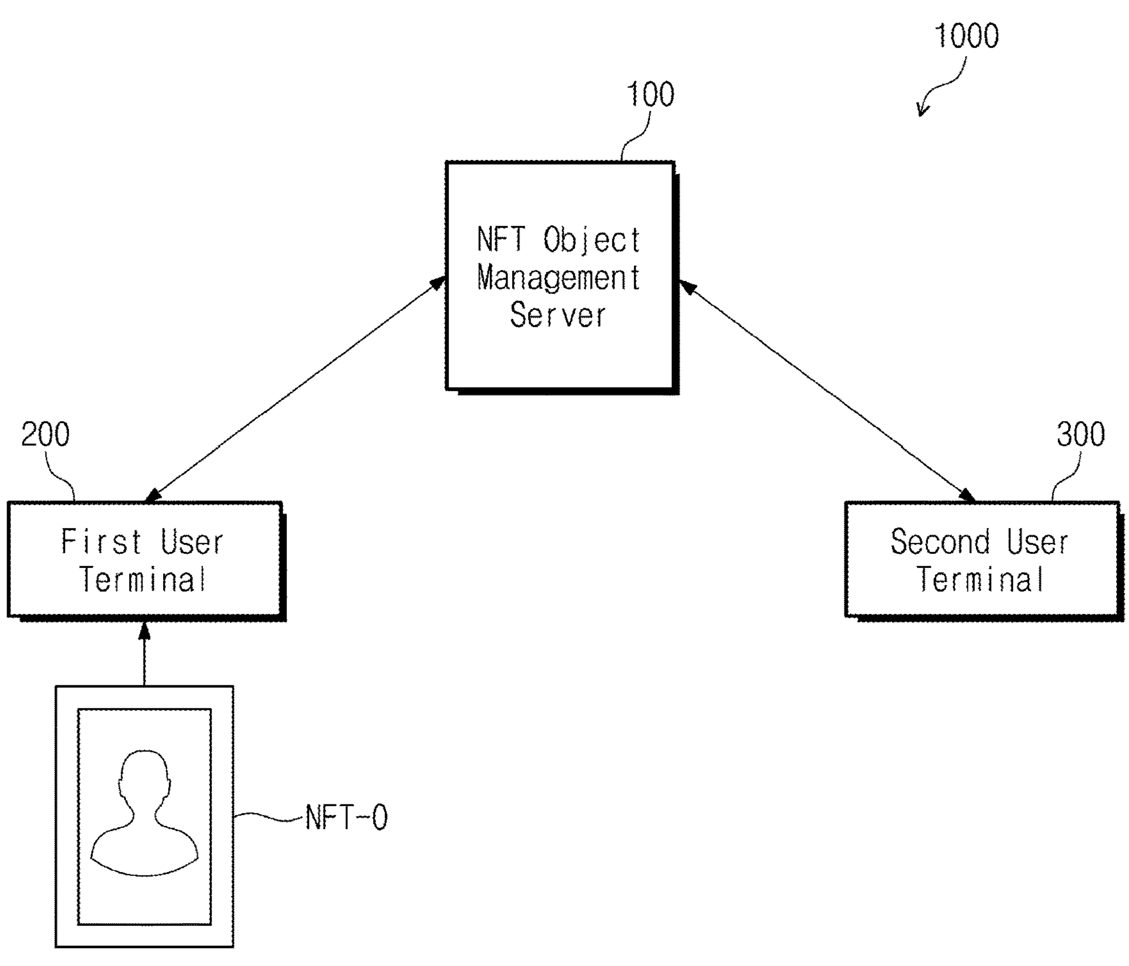
FIG. 1 is a conceptual diagram illustrating an NFT object management system, according to an embodiment of the present disclosure.

In the specification, the expression that a first component (or region, layer, part, portion, etc.) is "on", "connected with", or "coupled with" a second component means that the first component is directly on, connected with, or coupled with the second component or means that a third component is interposed therebetween.

The same reference numerals refer to the same components. Also, in drawings, the thickness, ratio, and dimension of components are exaggerated for effectiveness of description of technical contents.

Although the terms "first", "second", etc. may be used to describe various components, the components should not be construed as being limited by the terms. The terms are only used to distinguish one component from another component. For example, without departing from the scope and spirit of the present disclosure, a first component may be referred to as a second component, and similarly, the second component may be referred to as the first component. The articles "a," "an," and (sometimes) "the" are singular in that they have a single referent, but the use of the singular form in the specification should not preclude the presence of more than one referent.

Also, the terms "under", "below", "on", "above", etc. are used to describe the correlation of components illustrated in drawings. The terms that are relative in concept are described based on a direction shown in drawings.

It will be understood that the terms "include", "comprise", "have", etc. specify the presence of features, numbers, steps, operations, elements, or components, described in the specification, or a combination thereof, not precluding the presence or additional possibility of one or more other features, numbers, steps, operations, elements, or components or a combination thereof.

Unless otherwise defined, all terms (including technical terms and scientific terms) used in the specification have the same meaning as commonly understood by one skilled in the art to which the present disclosure belongs. Furthermore, terms such as terms defined in the dictionaries commonly used should be interpreted as having a meaning consistent with the meaning in the context of the related technology, and should not be interpreted in ideal or overly formal meanings unless explicitly defined herein.

Hereinafter, embodiments of the present disclosure will be described with reference to accompanying drawings.

FIG. 1 is a conceptual diagram illustrating an NFT object management system, according to an embodiment of the present disclosure.

Referring to FIG. 1, an NFT object management system 1000 may include an NFT object management server 100, a first user terminal 200, and a second user terminal 300.

The NFT object management server 100 may issue an NFT for an image of an NFT object NFT-O and may assign a code to the issued NFT. The NFT object management server 100 may issue the NFT based on a blockchain. The NFT object management server 100 may generate the code for the issued NFT and then may manage the generated code.

The NFT object NFT-O may include various objects such as clothing, accessories, buildings, cars, pets, and artworks.

The NFT (i.e., a non-fungible token) may refer to a blockchain-based token that is unique and scarce because it is impossible to exchange and copy the token. Because fungible cryptocurrencies like Bitcoin have the same value as each other, the fungible cryptocurrencies may be exchanged one-to-one. On the other hand, because a unique recognition value is assigned to the NFT, the NFT has a value and characteristics incapable of being replaced. Assets, to which the NFT is capable of being applied, may widely vary from digital content, for example, a video, an image, sound, and a text, to art, collections, game items, phonemes, various products, and real estate.

The NFT object management server 100 may communicate with the first user terminal 200 and the second user terminal 300 based on a platform of the NFT object management system 1000.

The first user terminal 200 may mean a terminal of a creator who has created the image of the NFT object NFT-O. For example, the first user terminal 200 may refer to an electronic device such as a communicable desktop computer, a laptop computer, a notebook, a smart phone, a smart TV, a smart watch, a tablet PC, a mobile phone, and a navigation device.

The first user terminal 200 may use the platform of the NFT object management system 1000 based on communication, and thus may communicate with the NFT object management server 100. The first user terminal 200 may request the issuance of an NFT for the NFT object NFT-O and the generation of a code for the NFT to the NFT object management server 100.

The second user terminal 300 may use a platform of the NFT object management system 1000 in a similar or identical manner to that of the first user terminal 200. The second user terminal 300 may refer to a terminal that desires to identify information about the NFT object NFT-O registered in the platform of the NFT object management system 1000 or to purchase the NFT object NFT-O. For example, the second user terminal 300 may identify the owner of the NFT object NFT-O, which the second user terminal 300 wishes to purchase, through the platform of the NFT object management system 1000, may identify information of a terminal of the owner who owns the NFT object NFT-O, and may make a request for information about the NFT object NFT-O to the first user terminal 200.

The NFT object management system 1000 may support a service for the management of the NFT object NFT-O in the first user terminal 200 and a request for information about the NFT object NFT-O capable of occurring in the second user terminal 300.

Figure 2:
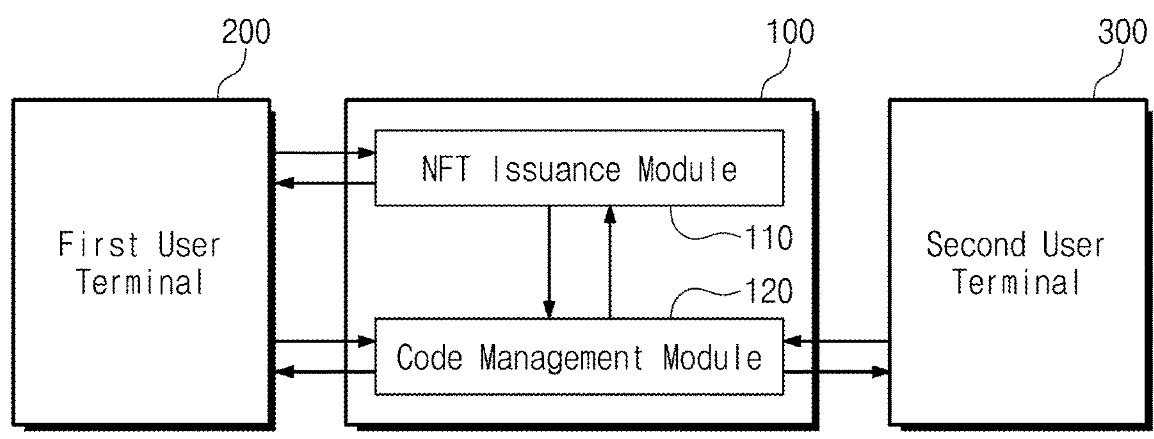
FIG. 2 is a block diagram of an NFT object management server, according to an embodiment of the present disclosure.

FIG. 2 is a block diagram of the NFT object management server 100, according to an embodiment of the present disclosure.

Referring to FIG. 2, the NFT object management server 100 may include an NFT issuance module 110 and a code management module 120. The NFT issuance module 110 may issue an NFT for the image of the NFT object NFT-O based on basic information about the NFT object NFT-O, which is registered in a platform by the first user terminal 200, and may provide the NFT for the image of the NFT object NFT-O to the first user terminal 200. As an example of the present disclosure, the NFT issuance module 110 may issue an NFT that provides ownership information about the NFT object NFT-O based on a block chain. The NFT issuance module 110 makes a request for the basic information necessary for issuing the NFT to the first user terminal 200 and may obtain the basic information.

The code management module 120 may create or manage a code for the image of the NFT object NFT-O. The code management module 120 may make a request for information required to generate and manage a code to the first user terminal 200 in advance and may obtain the required information. As an example of the present disclosure, the information may include the basic information about the NFT object NFT-O and device information of the first user terminal 200. The code management module 120 may generate the code based on the basic information and the device information and then may assign the generated code to the NFT issued by the NFT issuance module 110.

The second user terminal 300 may obtain information about a code for the corresponding object by capturing the code and may transmit the information about the code to the NFT object management server 100. The code management module 120 may verify the code of the corresponding object by using the second user terminal 300 and then may determine whether to provide the NFT to the second user terminal 300, based on the verification result. When the verification result for the information of the code obtained from the second user terminal 300 is true, the code management module 120 may provide the second user terminal 300 with at least one of an NFT for the corresponding object, information related to the NFT, and information about the object. On the other hand, when the verification result for the information of the code obtained from the second user terminal 300 is false, the code management module 120 may not provide the NFT for the corresponding object, the information related to the NFT, and the information about the corresponding object.

Figures 3A, 3B:
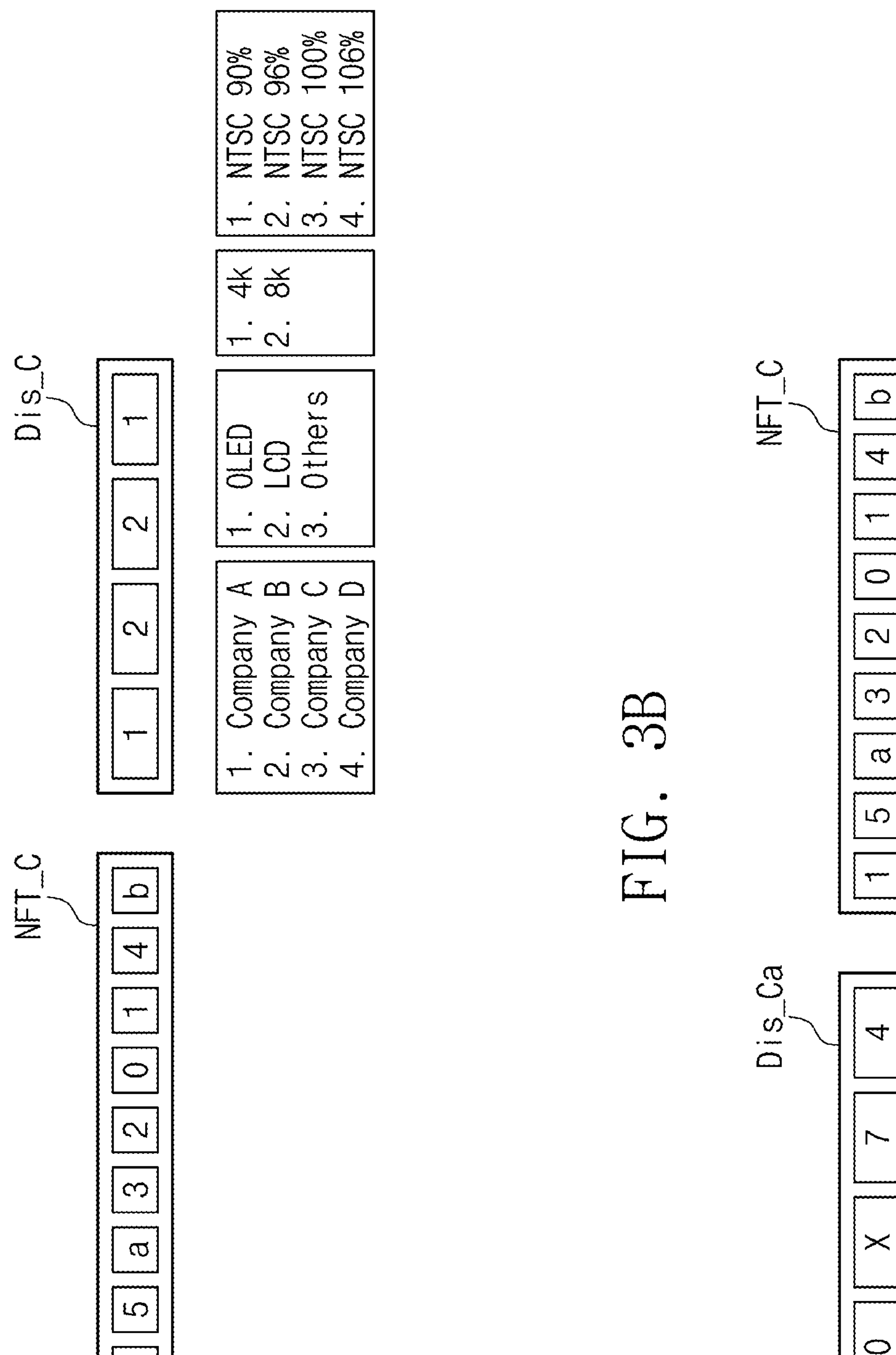
FIGS. 3A and 3B are diagrams illustrating codes, according to embodiments of the present disclosure.

FIGS. 3A and 3B are diagrams illustrating codes, according to embodiments of the present disclosure.

Referring to FIG. 3A, a code includes an NFT code NFT_C and a display code Dis_C. The NFT code NFT_C may be a code generated based on basic information about the NFT object NFT-O (see FIG. 1). The basic information may include the type of the NFT object, the number of transactions of the NFT object, an average transaction amount of the NFT object, a creator of the NFT object, a current owner of the NFT object, and a creation date of the NFT object. FIGS. 3A and 3B show that the NFT code NFT_C is a code composed of a combination of letters and numbers. However, the form of the NFT code NFT_C is not limited thereto. The NFT code NFT_C may be another type of a code such as a bar code or a three-dimensional code.

The display code Dis_C may be a code generated based on device information of the first user terminal 200 (see FIG. 2). The device information may include at least one of model information, frame rate information, and optical characteristic information about the first user terminal 200. For example, the model information may include set company information, display panel information, resolution information, pixel arrangement information, size information, and the like. The optical characteristic information may include color gamut information (or color coordinate information), luminance information, and the like.

FIG. 3A shows that the display code Dis_C is a code composed of numbers, but a format of the display code Dis_C is not limited thereto. As shown in FIG. 3B, the display code Dis_C may be a code composed of a combination of letters, numbers, and colors. Alternatively, the display code Dis_C may be another type of a code such as a bar code or a three-dimensional code. Moreover, as an example of the present disclosure, the display code Dis_C may be the same as a model code of the first user terminal 200.

As shown in FIG. 3A, a first code among the display code Dis_C may represent a company name of a company that has manufactured the first user terminal 200. For example, when the first code is “1”, the first user terminal 200 may be a product of company A. When the first code is “2”, the first user terminal 200 may be a product of company B. When the first code is “3”, the first user terminal 200 may be a product of company C. When the first code is “4”, the first user terminal 200 may be a product of company D.

A second code among the display code Dis_C may indicate the type of a display panel. When the second code is “1”, the display panel may be an OLED panel. When the second code is “2”, the display panel may be an LCD panel. When the second code is “3”, the display panel may be another panel.

A third code among the display code Dis_C may indicate a resolution. When the third code is “1”, the first user terminal 200 may have a resolution of 4K (3840×2160). When the third code is “2”, the first user terminal 200 may have a resolution of 8K (7680×4320).

A fourth code among the display code Dis_C may represent color coordinates. When the fourth code is “1”, the first user terminal 200 may have a color gamut of NTSC of 90%. When the fourth code is “2”, the first user terminal 200 may have a color gamut of NTSC of 96%. When the fourth code is “3”, the first user terminal 200 may have a color gamut of NTSC of 100%. When the fourth code is “4”, the first user terminal 200 may have a color gamut of NTSC of 106%.

In addition to information disclosed in FIG. 3A, various pieces of device information may be included in the display code Dis_C.

When a display code Dis_Ca is composed of a combination of letters, numbers, and colors as shown in FIG. 3B, various pieces of device information may be included in the display code Dis_Ca by expressing numbers and letters by using colors such as red, blue, and black.

Figure 4:
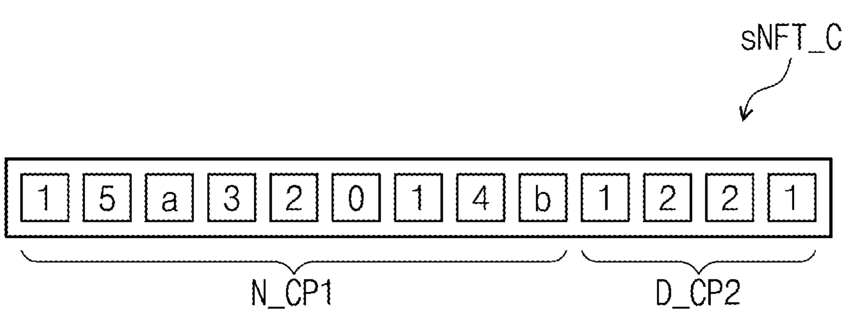
FIG. 4 is a diagram showing a standardized NFT code, according to an embodiment of the present disclosure.

FIG. 4 is a diagram showing a standardized NFT code, according to an embodiment of the present disclosure.

Referring to FIG. 4, the NFT object management server 100 (see FIG. 2) according to an embodiment of the present disclosure may generate a standardized code sNFT_C capable of being used in common on various platforms.

As an example of the present disclosure, the standardized code sNFT_C may include a first code part N_CP1 and a second code part D_CP2. The first code part N_CP1 may be a part generated based on basic information about the NFT object NFT-O (see FIG. 1). The second code part D_CP2 may be a part generated based on device information of the first user terminal 200 (see FIG. 2). FIG. 4 shows that the first code part N_CP1 is followed by the second code part D_CP2. However, this order may be reversed.

Descriptions of the first and second code parts N_CP1 and D_CP2 are the same as descriptions of the NFT code NFT_C and the display code Dis_C or Dis_Ca given with reference to FIGS. 3A and 3B, and thus a detailed description of the first and second code parts N_CP1 and D_CP2 are omitted to avoid redundancy. However, the standardized code sNFT_C may be a code generated by combining the NFT code NFT_C and the display code Dis_C or Dis_Ca.

Figure 5:
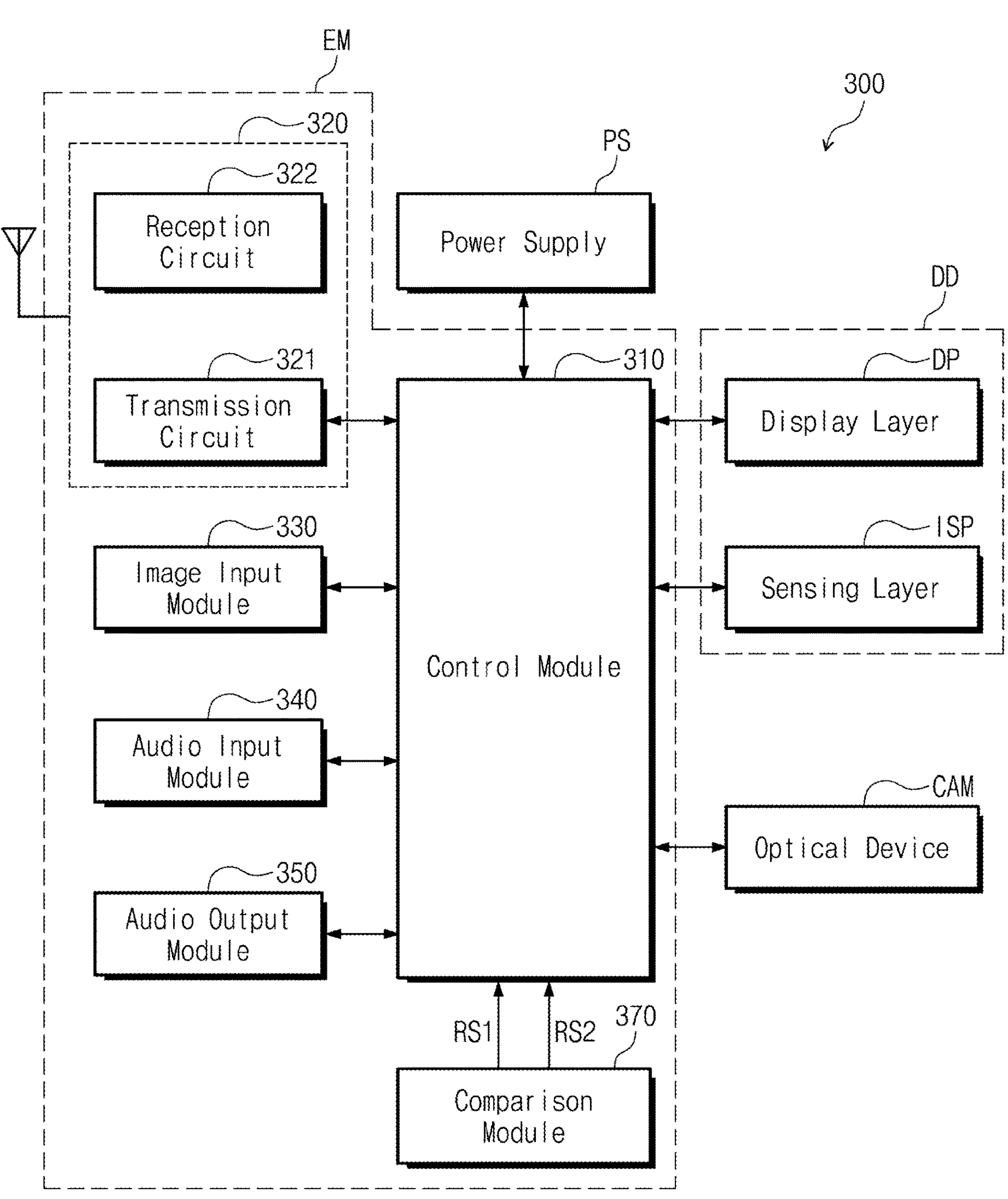
FIG. 5 is a block diagram of a second user terminal, according to an embodiment of the present disclosure.

FIG. 5 is a block diagram of a second user terminal, according to an embodiment of the present disclosure.

Referring to FIG. 5, the second user terminal 300 may communicate with the NFT object management server 100 (see FIG. 1). The second user terminal 300 may receive an NFT and a code from the NFT object management server 100. The second user terminal 300 may be a type of user terminal different from the first user terminal 200 that has created the image of the NFT object NFT-O (see FIG. 1), and may be a buyer terminal that purchases the NFT object NFT-O.

The second user terminal 300 may include an electronic module EM, a power supply PS, a display device DD, and an optical device CAM.

The power supply PS may supply power necessary for overall operations of the second user terminal 300. The power supply PS may include a battery.

The display device DD may include a display layer DP and a sensing layer ISP. The display layer DP may display image information about the NFT object NFT-O. The sensing layer ISP may receive an external input.

The optical device CAM may be an electronic component that outputs or receives an optical signal. The optical device CAM may transmit or receive the optical signal through a partial area of the display device DD. For example, the optical device CAM may include a camera.

The electronic module EM may include a control module 310, a wireless communication module 320, an image input module 330, an audio input module 340, an audio output module 350, and a comparison module 370. Each of the components may be mounted on a circuit board or may be electrically connected through a flexible circuit board. The electronic module EM may be electrically connected to the power supply PS.

The control module 310 may control overall operations of the second user terminal 300. For example, the control module 310 may activate or deactivate the display device DD in response to a user input. The control module 310 may control the image input module 330, the audio input module 340, and the audio output module 350 in response to a user input. The control module 310 may include at least one microprocessor.

The wireless communication module 320 may transmit/receive a wireless signal with another terminal by using Bluetooth or Wi-Fi. The wireless communication module 320 may transmit/receive voice signals by using general communication lines. The wireless communication module 320 may include a transmission circuit 321, which modulates and transmits a transmission signal, and a reception circuit 322 that demodulates the received signal.

The image input module 330 may convert an image signal into image data to be displayed on the display device DD by processing the image signal.

In a recording mode or a speech recognition mode, the audio input module 340 may receive an external audio signal from a microphone and then may convert the external audio signal into electrical voice data.

The audio output module 350 may convert audio data received from the wireless communication module 320 or audio data stored in a memory and then may output the converted data to the outside.

The comparison module 370 may compare device information of the first user terminal 200 and device information of the second user terminal 300 based on a code received from the NFT object management server 100. The comparison module 370 may transmit, to the control module 310, a first or second result signal RS1 or RS2 for determining whether to display the image of the NFT object NFT-O, based on the comparison result. Under the control of the control module 310, the image of the NFT object NFT-O may be displayed through the display device DD based on the first result signal RS1, or a warning message indicating that the image of the NFT object NFT-O is incapable of being displayed may be displayed through the display device DD based on the second result signal RS2.

When the device information of the first user terminal 200 matches the device information of the second user terminal 300, the comparison module 370 may output a first result signal RS1 to the control module 310. The control module 310 may transmit image data for the image of the NFT object NFT-O to the display device DD in response to the first result signal RS1. Accordingly, the display device DD may display the image of the NFT object NFT-O.

When the device information of the first user terminal 200 does not match the device information of the second user terminal 300, the comparison module 370 may output a second result signal RS2 to the control module 310. The control module 310 does not transmit image data for the NFT object NFT-O to the display device DD in response to the second result signal RS2. Accordingly, the display device DD may not display the image of the NFT object NFT-O. However, the warning message indicating that the NFT object NFT-O is incapable of being displayed may be displayed through the display device DD.

As a result, only when the device information of the first user terminal 200 matches the device information of the second user terminal 300, the image of the NFT object NFT-O may be displayed through the display device DD under the control of the control module 310 depending on the first and second result signals RS1 and RS2. When the device information of the first user terminal 200 does not match the device information of the second user terminal 300, an original image of the NFT object NFT-O may be distorted, and thus the control module 310 may block the image of the NFT object NFT-O from being displayed.

A case where the control module 310 blocks the display of the image of the NFT object NFT-O in response to the second result signal RS2 has been described with reference to FIG. 5. Alternatively, the second user terminal 300 may correct and display the image of the NFT object NFT-O. A detailed description thereof will be described with reference to FIG. 6.

Figure 6:
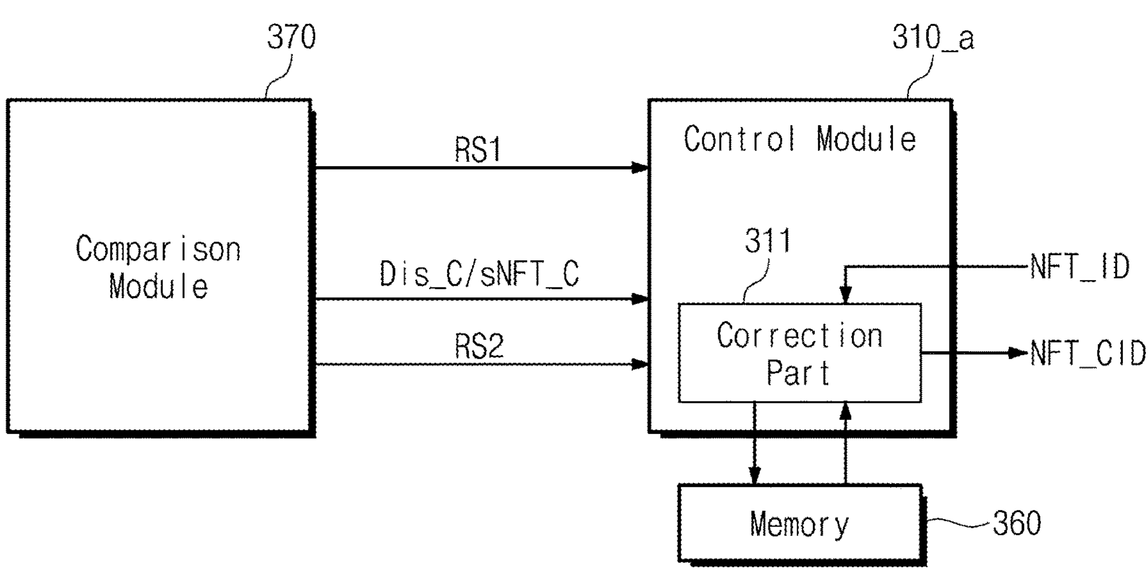
FIG. 6 is a block diagram showing a control module of a second user terminal, according to an embodiment of the present disclosure.

FIG. 6 is a block diagram showing a control module of a second user terminal, according to an embodiment of the present disclosure.

Referring to FIG. 6, a control module 310_*a* of the second user terminal 300 (see FIG. 1) may include a correction part 311. The correction part 311 may be activated in response to the second result signal RS2. Only when device information of the first user terminal 200 (see FIG. 1) does not match device information of the second user terminal 300, the correction part 311 may be activated.

The correction part 311 may receive image data NFT_ID for the image of the NFT object NFT-O (see FIG. 1) from the NFT object management server 100 (see FIG. 1). The correction part 311 may select a correction table, which corresponds to optical characteristic information of the first user terminal 200, from among a plurality of correction tables. The plurality of correction tables may be stored in a memory 360.

The correction part 311 may receive the display code Dis_C or a standardized code sNFT_C for the NFT object NFT-O and then may select one of the plurality of correction tables based on the display code Dis_C or the standardized code sNFT_C. The display code Dis_C or the standardized code sNFT_C may include device information about the first user terminal 200. The correction part 311 may select one correction table corresponding to the optical characteristic information of the first user terminal 200 based on the display code Dis_C or the standardized code sNFT_C.

The correction part 311 may generate compensation image data NFT_CID by compensating for the image data NFT_ID for the NFT object NFT-O based on the selected correction table. The control module 310_*a* may transmit the compensation image data NFT_CID to the display device DD (see FIG. 5), and the display device DD may display the image of the NFT object NFT-O based on the compensation image data NFT_CID substantially similarly to the original image without distortion.

Figure 7:
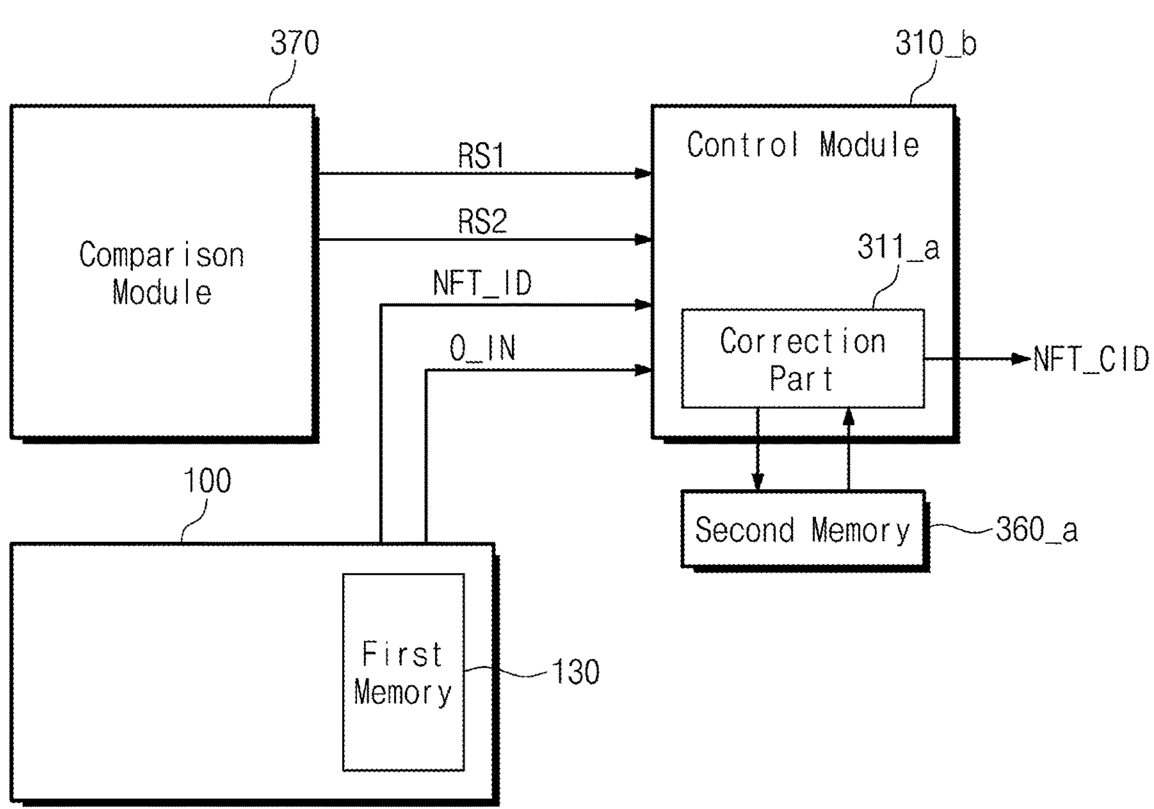
FIG. 7 is a block diagram showing a control module of a second user terminal, according to an embodiment of the present disclosure.

FIG. 7 is a block diagram showing a control module of a second user terminal, according to an embodiment of the present disclosure.

Referring to FIG. 7, a control module 310_*b* of the second user terminal 300 (see FIG. 1) may include a correction part 311_*a*. The correction part 311_*a* may be activated in response to the second result signal RS2. As an example of the present disclosure, only when device information of the first user terminal 200 (see FIG. 1) does not match device information of the second user terminal 300, the correction part 311_*a* may be activated.

The correction part 311_*a* may receive the image data NFT_ID for the NFT object NFT-O (see FIG. 1) and optical characteristic information O_IN of the first user terminal 200 from the NFT object management server 100 (see FIG. 1). The NFT object management server 100 may include a first memory 130 in which the optical characteristic information O_IN about the first user terminal 200 is stored.

The second user terminal 300 may include a second memory 360_*a* in which the plurality of correction tables are stored. The correction part 311_*a* may select a correction table, which corresponds to the optical characteristic information O_IN of the first user terminal 200, from among the plurality of correction tables.

The correction part 311_*a* may generate compensation image data NFT_CID by compensating for the image data NFT_ID for the NFT object NFT-O based on the selected correction table. The control module 310*b* may transmit the compensation image data NFT_CID to the display device DD (see FIG. 5), and the display device DD may display the image of the NFT object NFT-O based on the compensation image data NFT_CID substantially similarly to the original image without distortion.

Figure 8:
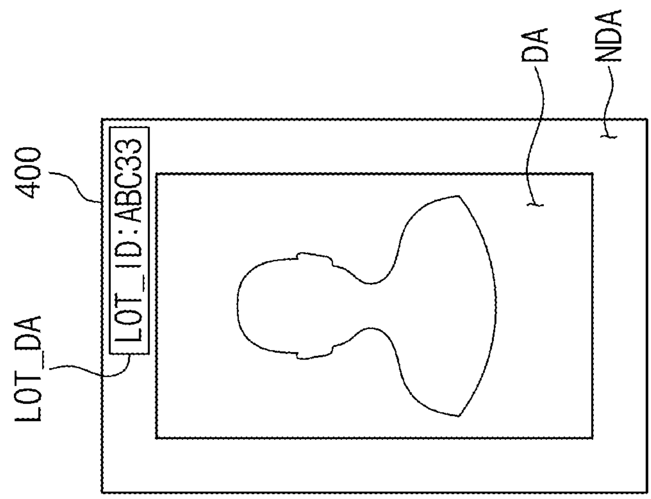
FIG. 8 is a block diagram showing an NFT object management server and a first user terminal, according to an embodiment of the present disclosure.
Figure 8:
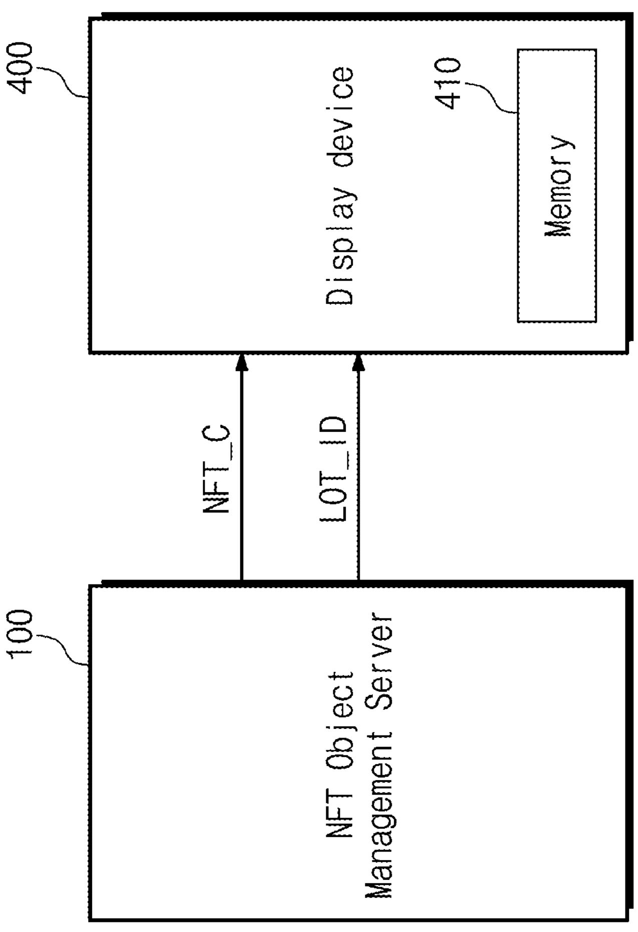

FIG. 8 is a block diagram showing an NFT object management server and a display device, according to an embodiment of the present disclosure.

Referring to FIG. 8, the NFT object management server 100 may issue an NFT for the image of the NFT object NFT-O (see FIG. 1) and may assign a code NFT_C to the issued NFT. The NFT object management server 100 may generate a lot ID LOT_ID for a display device 400 associated with the NFT object NFT-O. The display device 400 may be a device displaying the image of the NFT object NFT-O on a screen. The display device 400 may have the same type of a device as the first user terminal 200 (see FIG. 1) that has created the image of the NFT object NFT-O. The lot ID LOT_ID may be assigned to the display device 400, and the NFT object management server 100 may provide the display device 400, on which the NFT object NFT-O is displayed, to a creator of the image of the NFT object NFT-O or a buyer who purchases the NFT object NFT-O.

The display device 400 includes a display area DA, in which the NFT object NFT-O is displayed, and a peripheral area NDA surrounding the display area DA. A lot display area LOT_DA displaying the lot ID LOT_ID may be located in the peripheral area NDA. The lot display area LOT_DA is shown to be located at the upper right of the display area DA, but the location of the lot display area LOT_DA is not particularly limited thereto.

The display device 400 may include a memory 410 that stores image data for the image of the NFT object NFT-O, the code NFT_C, and the lot ID LOT_ID.

When the display device 400 is damaged or out of order, the NFT object management server 100 may cancel the lot ID LOT_ID for the display device 400, may generate a new lot ID, and may assign the new lot ID to another display device.

Figure 9:
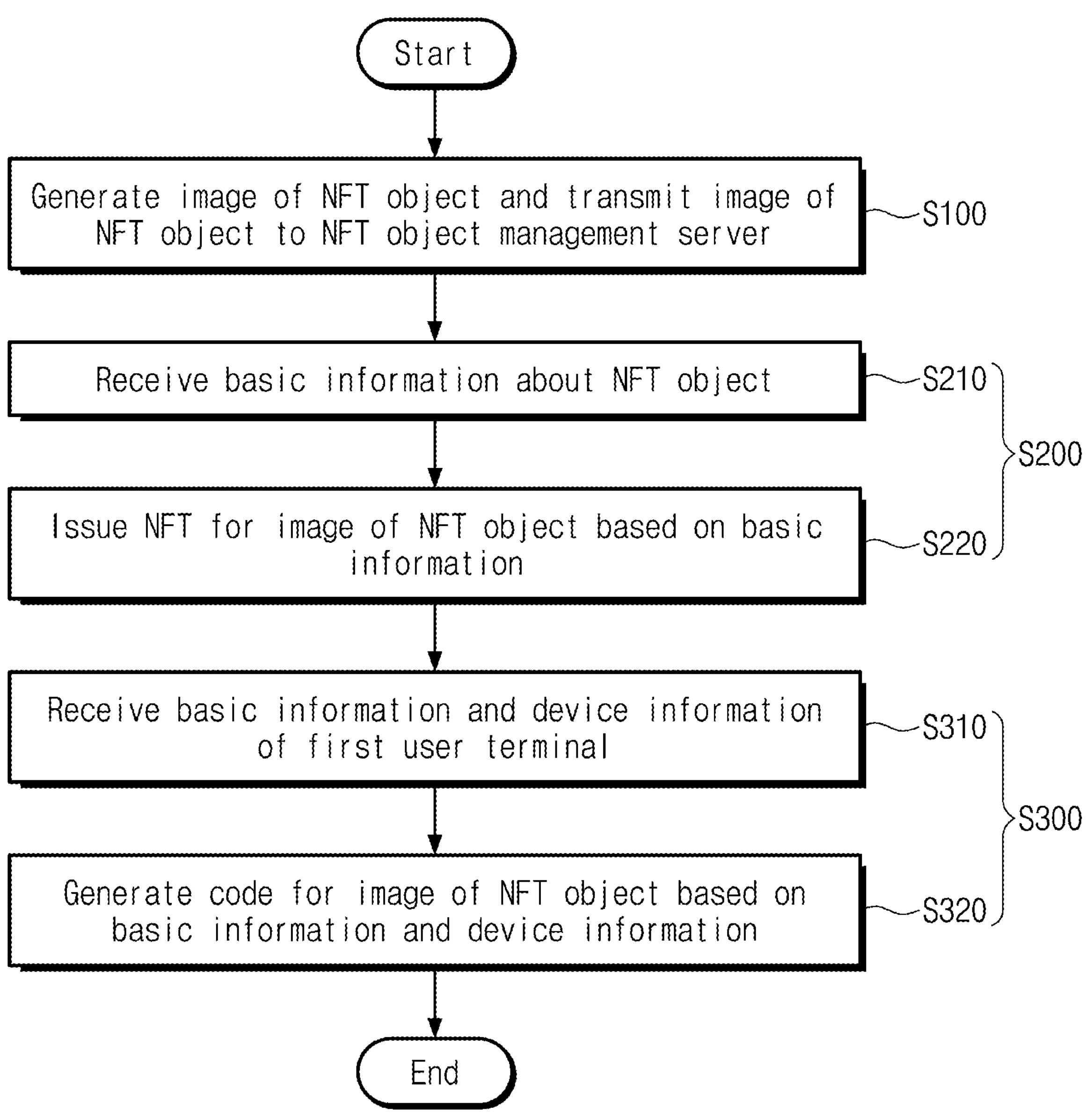
FIGS. 9 and 10 are flowcharts illustrating an NFT object management method, according to an embodiment of the present disclosure.
Figure 10:
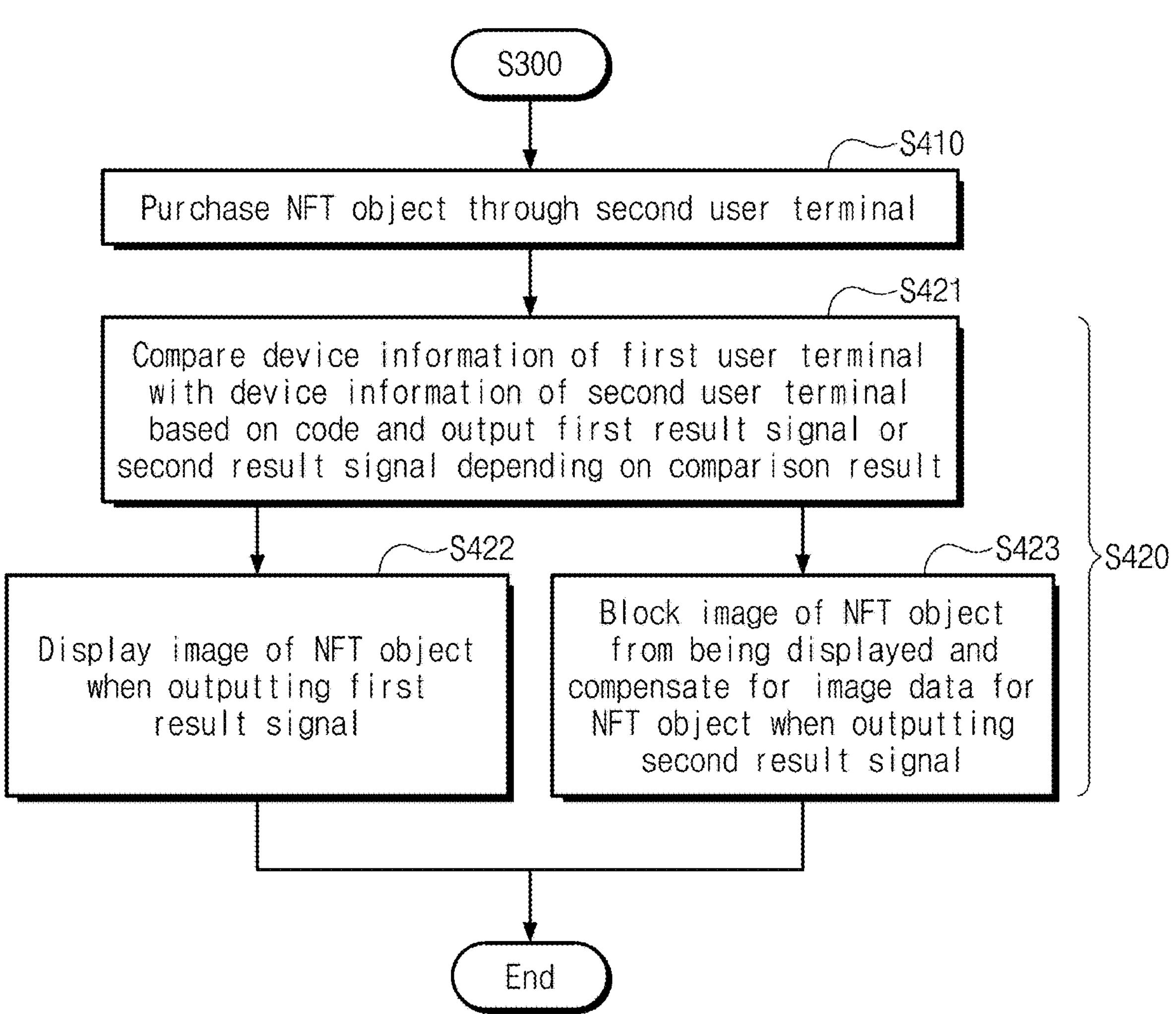

FIGS. 9 and 10 are flowcharts illustrating an NFT object management method, according to an embodiment of the present disclosure.

Referring to FIGS. 1, 9, and 10, the NFT object management method according to an embodiment of the present disclosure includes step S100 of generating an image of the NFT object NFT-O through the first user terminal 200 and transmitting the image of the NFT object NFT-O to the NFT object management server 100, step S200 of issuing an NFT for the image of the NFT object NFT-O, and step S300 of assigning a code to the issued NFT and managing the assigned code.

Step S200 of issuing the NFT includes step S210 of receiving basic information about the NFT object NFT-O from the first user terminal 200 and step S220 of issuing the NFT for the image of the NFT object NFT-O based on the basic information.

Step S300 of assigning the code includes step S310 of receiving the basic information about the NFT object NFT-O and device information of the first user terminal 200 from the first user terminal 200. Step S300 of assigning the code further includes step S320 of generating the code for the NFT object NFT-O based on the basic information and the device information. The code may be implemented as one of the codes shown in FIGS. 3A, 3B and 4.

As shown in FIGS. 1, 5, and 10, the NFT object management method includes step S410 of purchasing the NFT object NFT-O from the NFT object management server 100 through the second user terminal 300 and step S420 of displaying the image of the purchased NFT object NFT-O on the second user terminal 300.

Step S420 of displaying the NFT object NFT-O on the second user terminal 300 may include step S421 of comparing device information of the first user terminal 200 and device information of the second user terminal 300 based on the code and outputting the first result signal RS1 or the second result signal RS2 depending on the comparison result.

The NFT object management method may include receiving one of the first and second result signals RS1 and RS2 and then may determine whether to display the NFT object NFT-O depending on the first result signal RS1 or the second result signal RS2. For example, when outputting the first result signal RS1, the second user terminal 300 may display the NFT object NFT-O (S422). When outputting the second result signal RS2, the second user terminal 300 may block the NFT object NFT-O from being displayed (S423). As an example of the present disclosure, when the device information of the first user terminal 200 matches the device information of the second user terminal 300, the first result signal RS1 may be output. When the device information of the first user terminal 200 does not match the device information of the second user terminal 300, the second result signal RS2 may be output.

Accordingly, the second user terminal 300 may block the original image of the NFT object NFT-O from being displayed so that the original image of the NFT object NFT-O is not displayed as a distorted image of the original image.

Alternatively, the NFT object management method may receive one of the first and second result signals RS1 and RS2 and then may determine whether to compensate for image data for the image of the NFT object, depending on the first result signal RS1 or the second result signal RS2. For example, when outputting the first result signal RS1, the second user terminal 300 may display image data for the image of the NFT object NFT-O without the compensation (S422). When outputting the second result signal RS2, the second user terminal 300 may compensate for image data for the NFT object NFT-O and then may display the compensated image data (S423). Accordingly, the second user terminal 300 may display an image of the NFT object NFT-O substantially similarly to the original image without distortion.

Some components within the present disclosure include the noun "module," for example, the NFT issuance module 110, the code management module 120, and the control module 310. As used herein, the word "module" may refer to software, hardware, or a combination of hardware and software. The hardware may be one or more integrated circuits, one or more printed circuit boards, or a combination of one or more integrated circuits and one or more circuit boards.

Although embodiments of the present disclosure has been described for illustrative purposes, those skilled in the art will appreciate that various modifications, and substitutions are possible, without departing from the scope and spirit of the present disclosure as disclosed in the accompanying claims. Accordingly, the technical scope of the present disclosure is not limited to the detailed description of this specification, but should be defined by the claims.

As described above, an NFT object management system may assign an NFT code to an NFT issued for an image of an NFT object, and may additionally assign a display code by reflecting device information about a first user terminal where an NFT object has been created. Accordingly, on the basis of the display code, image data for the image of the NFT object may be compensated such that an original image of the NFT object is prevented from being displayed as a distorted image, or is not displayed to avoid displaying a distorted image of an original image of the NFT object when another user terminal purchasing the NFT object attempts to display the image of the NFT object.

While the present disclosure has been described with reference to embodiments thereof, it will be apparent to those of ordinary skill in the art that various changes and modifications may be made thereto without departing from the spirit and scope of the present disclosure as set forth in the following claims.

What is claimed is:

1. A non-fungible token (NFT) object management system, the system comprising:

an NFT object management server configured to issue an NFT for an image of an NFT object and to assign a code to the NFT; and a first user terminal configured to communicate with the NFT object management server, to generate the image of the NFT object, and to transmit the image of the NFT object to the NFT object management server, wherein the NFT object is selected from clothing, accessories, buildings, cars, pets, and artworks, wherein the NFT object management server is configured to:

receive basic information about the NFT object from the first user terminal and device information from the first user terminal, and to issue the NFT for the image of the NFT object;

generate the code for the image of the NFT object based on the basic information and the device information; and verify the image of the NFT object for display on a second user terminal based on the code, wherein the NFT object management server generates a lot ID for a display device associated with the NFT object, wherein the display device includes a memory configured to store image data for the NFT object, the code, and the lot ID, and wherein the NFT object management server cancels the lot ID for the display device, generates a new lot ID, and assigns the new lot ID to another display device.

2. The system of claim 1, wherein the code includes:

an NFT code generated based on the basic information; and a display code generated based on the device information.

3. The system of claim 1, wherein the code is a standardized code including a first code part generated based on the basic information and a second code part generated based on the device information.

4. The system of claim 1, wherein the device information may include at least one of model information or optical characteristic information about the first user terminal.

5. The system of claim 1, further comprising:

the second user terminal configured to receive the image of the NFT object and the code from the NFT object management server and to display the image of the NFT object.

6. The system of claim 5, wherein the second user terminal includes a display device configured to display an image, wherein the second user terminal is configured to:

compare the device information of the first user terminal with device information of the second user terminal based on the code and to output a first result signal or a second result signal depending on the comparison result; and receive one of the first result signal and the second result signal and to control driving of the display device depending on the first result signal or the second result signal.

7. The system of claim 6, wherein the control module is configured to:

when the device information of the first user terminal matches the device information of the second user terminal, receive the first result signal from the comparison module and transmit image data for the image of the NFT object to the display device in response to the first result signal; and when the device information of the first user terminal does not match the device information of the second user terminal, receive the second result signal from the comparison module and block the image data for the NFT object from being transmitted to the display device in response to the second result signal.

8. The system of claim 6, wherein the NFT object management server includes a first memory in which optical characteristic information about the first user terminal is stored, and wherein the second user terminal further includes:

a second memory in which a plurality of correction tables are stored.

* * * * *